United States Patent
Imine et al.

(10) Patent No.: US 7,604,160 B2
(45) Date of Patent: Oct. 20, 2009

(54) IMAGE FORMING APPARATUS, IMAGE FORMING METHOD AND STORAGE MEDIUM

(75) Inventors: Ryotaro Imine, Kawasaki (JP); Yasuaki Sawano, Kawasaki (JP); Toshio Yoshihara, Kawasaki (JP); Yuuichii Hagiwara, Ohta-ku (JP); Shozo Yamasaki, Yokohama (JP); Kota Kato, Meguro-ku (JP); Makoto Kikugawa, Ohta-ku (JP); Eiji Ohara, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 626 days.

(21) Appl. No.: 11/235,750

(22) Filed: Sep. 27, 2005

(65) Prior Publication Data

US 2006/0076399 A1 Apr. 13, 2006

(30) Foreign Application Priority Data

Sep. 29, 2004 (JP) .............................. 2004-285165

(51) Int. Cl.
| | |
|---|---|
| G06F 17/00 | (2006.01) |
| G06K 7/00 | (2006.01) |
| G06K 7/08 | (2006.01) |
| G06K 7/10 | (2006.01) |
| G06F 3/12 | (2006.01) |
| G06K 15/00 | (2006.01) |
| H04Q 5/22 | (2006.01) |
| G08B 13/14 | (2006.01) |

(52) U.S. Cl. ...................... 235/375; 235/435; 235/449; 235/451; 358/1.1; 358/1.15; 358/1.16; 358/1.18; 358/1.13; 340/572.1

(58) Field of Classification Search ................. 235/375, 235/435, 449, 451; 358/1.1, 1.15, 1.16, 1.18, 358/1.13; 340/572.1, 10.6

See application file for complete search history.

(56) References Cited

U.S. PATENT DOCUMENTS

| | | | | |
|---|---|---|---|---|
| 6,047,110 | A * | 4/2000 | Smith | 358/1.12 |
| 6,846,056 | B2 * | 1/2005 | Jacobsen et al. | 347/14 |
| 7,123,367 | B1 * | 10/2006 | Kanaya et al. | 358/1.13 |
| 7,196,714 | B2 * | 3/2007 | Someno | 347/212 |
| 2001/0050782 | A1 * | 12/2001 | Niitsuma et al. | 358/1.15 |
| 2002/0170973 | A1 * | 11/2002 | Teraura | 235/492 |
| 2004/0036901 | A1 * | 2/2004 | Nakane | 358/1.13 |
| 2004/0041821 | A1 * | 3/2004 | Watanabe et al. | 345/619 |
| 2004/0046985 | A1 * | 3/2004 | Watanabe et al. | 358/1.13 |
| 2004/0114023 | A1 * | 6/2004 | Jacobsen et al. | 347/106 |
| 2004/0223181 | A1 * | 11/2004 | Narusawa | 358/1.15 |
| 2004/0257601 | A1 * | 12/2004 | Tomiyasu et al. | 358/1.9 |

(Continued)

FOREIGN PATENT DOCUMENTS

JP 2002-337426 11/2002

*Primary Examiner*—Daniel Walsh
(74) *Attorney, Agent, or Firm*—Canon USA Inc IP Div

(57) ABSTRACT

In a method for controlling an image forming apparatus capable of reading predetermined information, the image forming apparatus can operate in a first mode in which processing conditions set by a user through a user interface unit of the image forming apparatus can be used or a second mode in which processing conditions based on the predetermined information can be used. Accordingly, operability of the image forming apparatus capable of forming an image by using a document with an information tag can be enhanced.

15 Claims, 15 Drawing Sheets

U.S. PATENT DOCUMENTS

| | | | |
|---|---|---|---|
| 2005/0111043 A1* | 5/2005 | Kato | 358/1.18 |
| 2005/0122540 A1* | 6/2005 | Kadowaki | 358/1.15 |
| 2006/0031159 A1* | 2/2006 | Minot et al. | 705/38 |
| 2006/0055514 A1* | 3/2006 | Maeyama et al. | 340/10.5 |
| 2006/0065744 A1* | 3/2006 | Tai et al. | 235/492 |
| 2006/0076399 A1* | 4/2006 | Imine et al. | 235/375 |
| 2006/0139679 A1* | 6/2006 | Barry et al. | 358/1.13 |
| 2006/0181562 A1* | 8/2006 | Hirano et al. | 347/15 |
| 2006/0221358 A1* | 10/2006 | Takahashi | 358/1.1 |
| 2007/0070383 A1* | 3/2007 | Fujimori et al. | 358/1.13 |
| 2007/0165258 A1* | 7/2007 | Farrell et al. | 358/1.13 |
| 2008/0198411 A1* | 8/2008 | Ogasawara et al. | 358/1.16 |
| 2009/0021789 A1* | 1/2009 | Sugimoto | 358/1.16 |
| 2009/0125360 A1* | 5/2009 | Ito | 705/8 |

\* cited by examiner

IMAGE FORMING APPARATUS, IMAGE FORMING METHOD AND STORAGE MEDIUM

BACKGROUND OF THE INVENTION

1. Field of the Invention

The present invention relates to an image forming apparatus and an image forming method, and more particularly to an image forming apparatus, an image forming method, and a storage medium in which a sheet of paper with an information tag can be used.

2. Description of the Related Art

In recent years, radio tags using RFID (radio frequency identification) or the like are being replaced by barcodes in order to manage and identify products. The radio tag includes an antenna and an IC (integrated circuit) and has functions of performing radio communication with an external device and recording/storing various information.

In a system using the radio tags, tag information including ID information unique to respective managed products is stored in ICs of the radio tags, and the radio tags are attached to the managed products. The tag information is read by a reader from the radio tags in a noncontact manner, and the read tag information is used to manage the products.

The radio tags are characteristic in that data can be transmitted/received in a noncontact manner and that a plurality of pieces of tag information can be read at one time. By using these characteristics, management of products, that has been traditionally performed by using barcodes, can be performed more efficiently.

As an application of the radio tags, a sheet of paper with an RFID tag formed by embedding a radio tag in a paper medium has been proposed (see Patent Document 1: Japanese Patent Laid-Open No. 2002-337426). This sheet with a tag has been proposed as printing paper provided with an RFID tag in which data can be read/written, and the data is transmitted/received through radio waves. Image data is printed on the printing paper, and the image data is stored in the RFID tag in a form of electronic data. By providing a reader/writer for documents and a reader/writer for printing paper in a copying machine having printer and facsimile functions, the electronic data can be transmitted/received as necessary.

Also, by storing control information for an image forming apparatus in the RFID tag in addition to image data and by reading print setting and so on when scanning a sheet with the RFID tag, a setting operation on the apparatus can be simplified.

For example, as setting information for the image forming apparatus, an operation mode, such as magnification and density setting, and information about restriction of function, such as prohibition of copying, can be attached to a document composed of a sheet/sheets with an RFID tag. Accordingly, the image forming apparatus can be automatically set for each sheet of document based on the information.

However, the following problems can occur by only providing an RFID reader/writer in a conventional copying machine, that is, by only providing a unit of reading information from a sheet with an RFID tag.

For example, if a document embedded with a tag and an ordinary document are mixed, it is difficult to visually distinguish the two types of documents from each other. Therefore, assuming that a copying machine is automatically set based on setting information read from an RFID tag, a copying operation may be performed even though the user cannot recognize that the setting has been changed. In this case, a result against a user's demand may be output disadvantageously.

For example, assume a case where a plurality of sheets of a document is to be copied, in which a first sheet is provided with an RFID tag and scaling of A4/A3 is automatically set. In this case, even when a second sheet is an ordinary sheet that should be copied at a 1× magnification in accordance with instructions from a user through an operation unit, the scaling setting made on the first sheet is forcefully enabled, and as a result, a copying operation desired by the user cannot be performed. Typically, the user tends to recognize that setting in an operation unit becomes effective upon pressing a copy start key when a document to be copied is an ordinary document. Therefore, various contradictions may arise between the setting made by the user and the setting based on RFID information.

SUMMARY OF THE INVENTION

The present invention is directed to an image forming apparatus, an image forming method, and a storage medium.

Also, the present invention is directed to an image forming apparatus, an image forming method, and a storage medium capable of enhancing operability of the image forming apparatus capable of forming an image using a document with an information tag.

Also, the present invention is directed to an image forming apparatus, an image forming method, and a storage medium capable of generating a result desired by a user even when setting based on information read from an information tag of a document is different from setting in an operation unit. In one aspect of the present invention, an image forming apparatus capable of reading predetermined information, includes a user interface unit configured to allow a user to set processing conditions; a selector facilitating selecting one of a first mode in which processing conditions set by the user through the user interface unit are selected and a second mode in which processing conditions based the predetermined information are selected; and a controller controlling performing an operation based on the one of the first and second modes selected by the selector.

Further features of the present invention will become apparent from the following description of exemplary embodiments with reference to the attached drawings.

DESCRIPTION OF THE EMBODIMENTS

Hereinafter, embodiments of the present invention are described with reference to the accompanying drawings.

First Embodiment

Sheet of Paper with an RFID Tag

Figure 1:
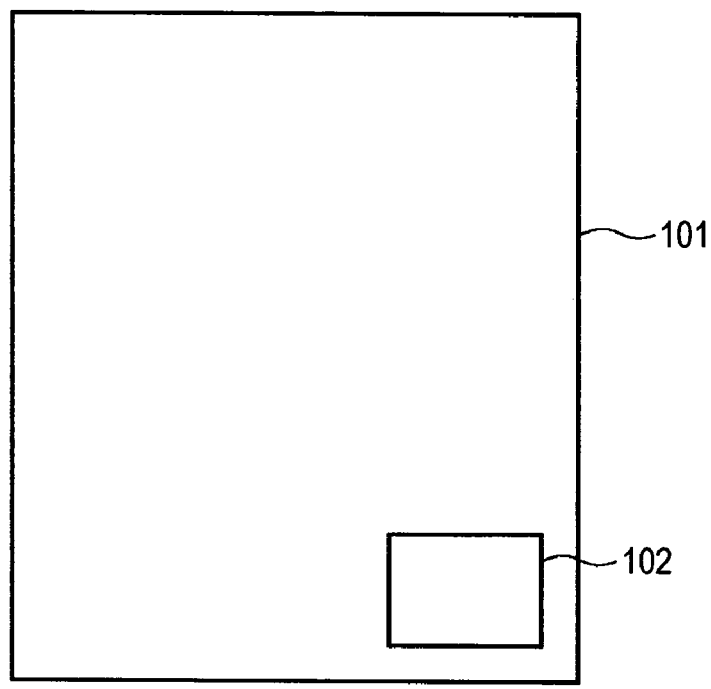
FIG. 1 shows a sheet with an RFID tag used in a first embodiment of the present invention.

FIG. 1 shows an example of printing paper with an RFID (radio frequency identification) tag. A sheet 101 is a sheet of paper used for typical printing, on which an RFID tag 102 is attached. Alternatively, the RFID tag 102 is embedded therein during a manufacturing process. Data can be read/written from/in the RFID tag 102 attached to the sheet 101 by using a dedicated reader/writer. Herein, data is read/written by radio transmission/reception using radio waves without connecting the RFID tag 102 and the reader/writer.

<RFID Tag>

Figure 2:
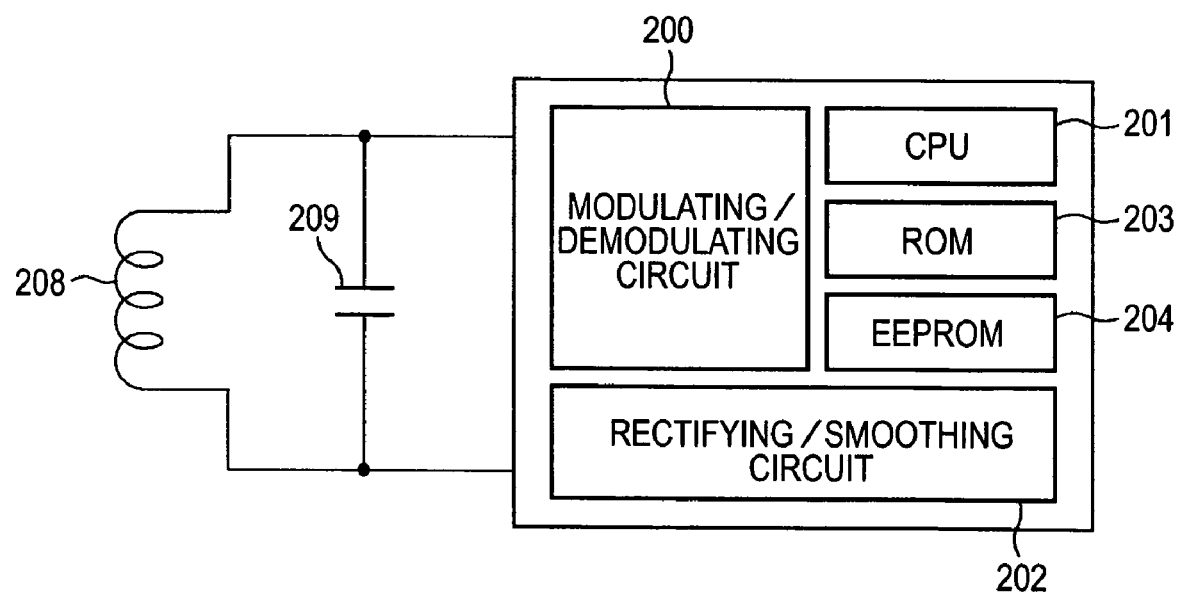
FIG. 2 is a block diagram showing an electric configuration of the RFID tag.

FIG. 2 is a block diagram showing an electric configuration of the RFID tag 102. As shown in FIG. 2, the RFID tag 102 includes an antenna coil 208 to receive radio wave signals; a resonance capacitor 209; a modulating/demodulating circuit 200; a CPU (central processing unit) 201 serving as a control unit; a rectifying/smoothing circuit 202; a ROM (read only memory) 203 serving as a memory unit; and an EEPROM (electrically erasable programmable read only memory) 204 serving as a storage element (e.g., an erasable nonvolatile memory) in which information can be written. Hereafter, a unit composed of the antenna coil 208 and the resonance capacitor 209 is called an "antenna unit" and the other part is called an "IC unit". The antenna unit is printed on a film and the IC unit is mounted on the film in the form of a small chip. The film is embedded in printing paper.

In the RFID tag 102, the antenna unit has a transmitting/receiving function and also has a power supplying function. More specifically, when the RFID tag 102 passes through an electromagnetic field of a predetermined frequency radiated from the reader/writer (described later), an induced voltage is generated in the antenna unit, and the induced voltage drives the IC unit. Therefore, the RFID tag 102 does not require a battery or the like. With this configuration, the lifetime thereof is not substantially limited, and the size and weight of the tag can be reduced. Further, replacement of batteries is not necessary, so that maintenance-free can be realized.

Hereinafter, an operation of each part of the RFID tag 102 is described in detail.

The antenna coil 208 connects in parallel to the resonance capacitor 209 so as to form a resonance circuit. When a powering radio wave signal having a predetermined high frequency is transmitted from the reader/writer, the antenna coil 208 receives the signal and supplies it to the rectifying/smoothing circuit 202.

The rectifying/smoothing circuit 202, which functions as an operating power supply circuit, rectifies and smoothes the powering radio wave signal transmitted from the resonance circuit, and then supplies the signal as a constant-voltage DC power to the CPU 201 and so on.

A signal from the reader/writer is transmitted while being superimposed on the powering radio wave signal, is demodulated by the modulating/demodulating circuit 200, and is then supplied to the CPU 201. The CPU 201 operates in accordance with an operation program stored in the ROM 203. Specifically, the CPU 201 executes a process in response to a signal input from the modulating/demodulating circuit 200 and writes received data in the EEPROM 204. Also, the CPU 201 reads data from the EEPROM 204, allows the modulating/demodulating circuit 200 to modulate the data, and outputs the data in a form of a radio wave signal through the antennal coil 208.

<RFID Reader/Writer>

Figure 3:
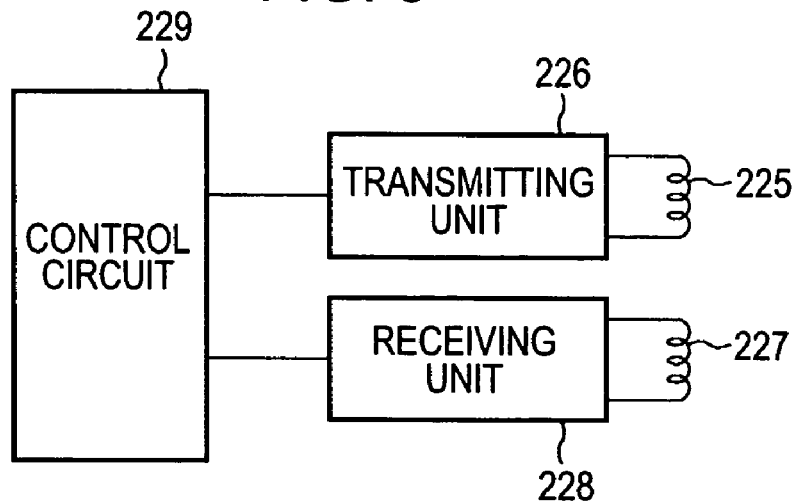
FIG. 3 is a block diagram showing an electric configuration of an RFID reader/writer.

FIG. 3 is a block diagram showing an electric configuration of the RFID reader/writer. The RFID reader/writer includes a transmitting unit 226 having a transmitting antenna coil 225 and a receiving unit 228 having a receiving antenna coil 227. The transmitting unit 226 and the receiving unit 228 connect to a control circuit 229 serving as a control unit to control an entire copying machine (described later).

In order to communicate with the RFID tag 102, the control circuit 229 allows the transmitting unit 226 to modulate a carrier signal and transmit the signal as a powering radio wave signal from the transmitting antenna coil 225. Then, the control circuit 229 allows the transmitting unit 226 to superimpose a data signal to be transmitted on the powering radio wave signal and transmits the signal from the transmitting antennal coil 225. On the other hand, a radio wave signal transmitted from the RFID tag 102 is received by the receiving antenna coil 227, is demodulated by the receiving unit 228, and is discriminated as data.

<Tag Information>

Figure 4:
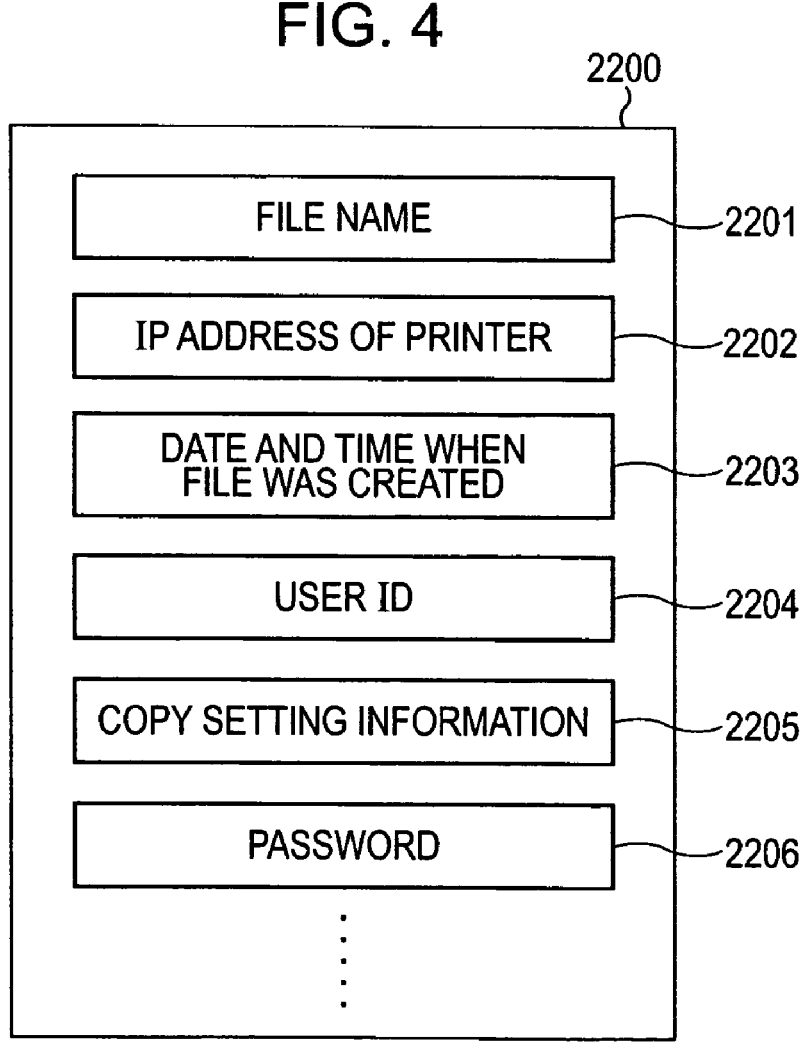
FIG. 4 shows an example of information stored in the RFID tag.

FIG. 4 shows an example of tag information written in the RFID tag 102.

A tag information format 2200 stores a file name 2201; an IP address 2202 of a machine that temporarily stores data; date and time data 2203 when electronic data is created and stored in the EEPROM 204 serving as a temporary storage element; a user ID 2204 of a user who uses the system; setting information 2205 used to perform copying; password information 2206 used to print electronic data; and so on.

The tag information format shown in FIG. 4 is only an example, and another format may also be adopted as long as the tag information includes setting information of an image forming apparatus.

Image Forming Apparatus

Hereinafter, a digital copying machine serving as an image forming apparatus according to an embodiment of the present invention is described.

<Appearance of the Image Forming Apparatus>

Figure 5:
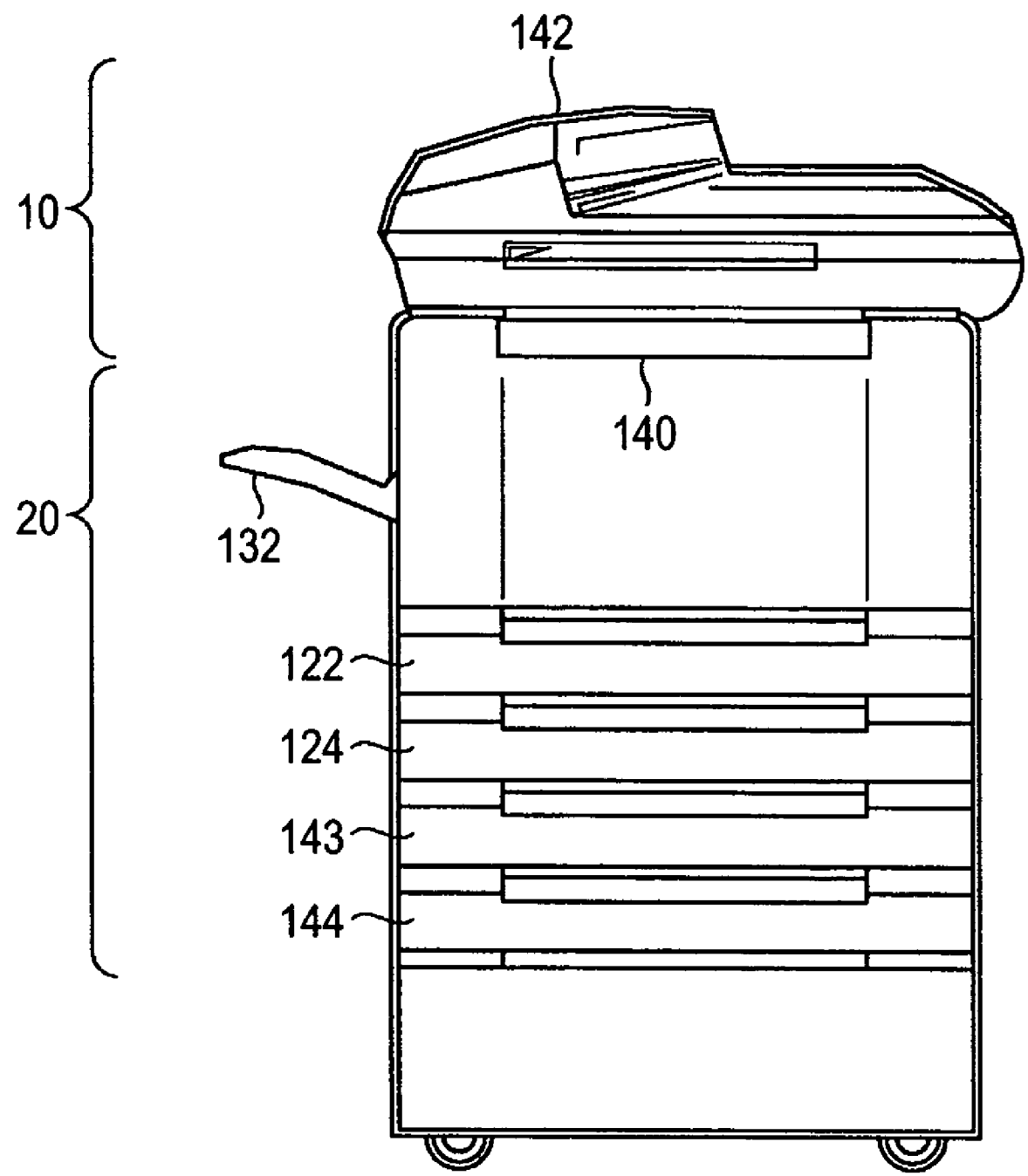
FIG. 5 shows an appearance of an image forming apparatus according to the first embodiment.

FIG. 5 shows an appearance of the digital copying machine which includes a scanner unit 10 functioning as an image input device and a printer unit 20 functioning as an image output device.

In the scanner unit 10, a document image is irradiated with light from a lamp, is read by a CCD line sensor (not shown), and is converted to an electric signal. Accordingly, the document image is captured as image data. After a user sets document sheets on a document feeder 142 and provides instructions to read the document through an operation unit 140, the document feeder 142 functioning as an automatic document feeder (ADF) feeds the sheets one after another. In this way, the above-described document image reading operation is performed.

The printer unit 20 converts image data to an image on a sheet of paper. Herein, the printer unit 20 performs electrophotographic printing using a photoconductive drum or a photoconductive belt. However, an inkjet method, in which ink is ejected from a micro nozzle array to directly print an image on paper, can also be used.

A printing operation is started in response to instructions from a controller (described later) in the apparatus. The printer unit 20 is provided with a plurality of paper feeders so that a user can select various paper sizes or paper directions, and also with paper cassettes 122, 124, 143, and 144 corresponding to the respective paper feeders. After an image is formed on a sheet, the sheet is output to an output tray 132.

<Specific Configuration of the Image Forming Apparatus>

Figure 6:
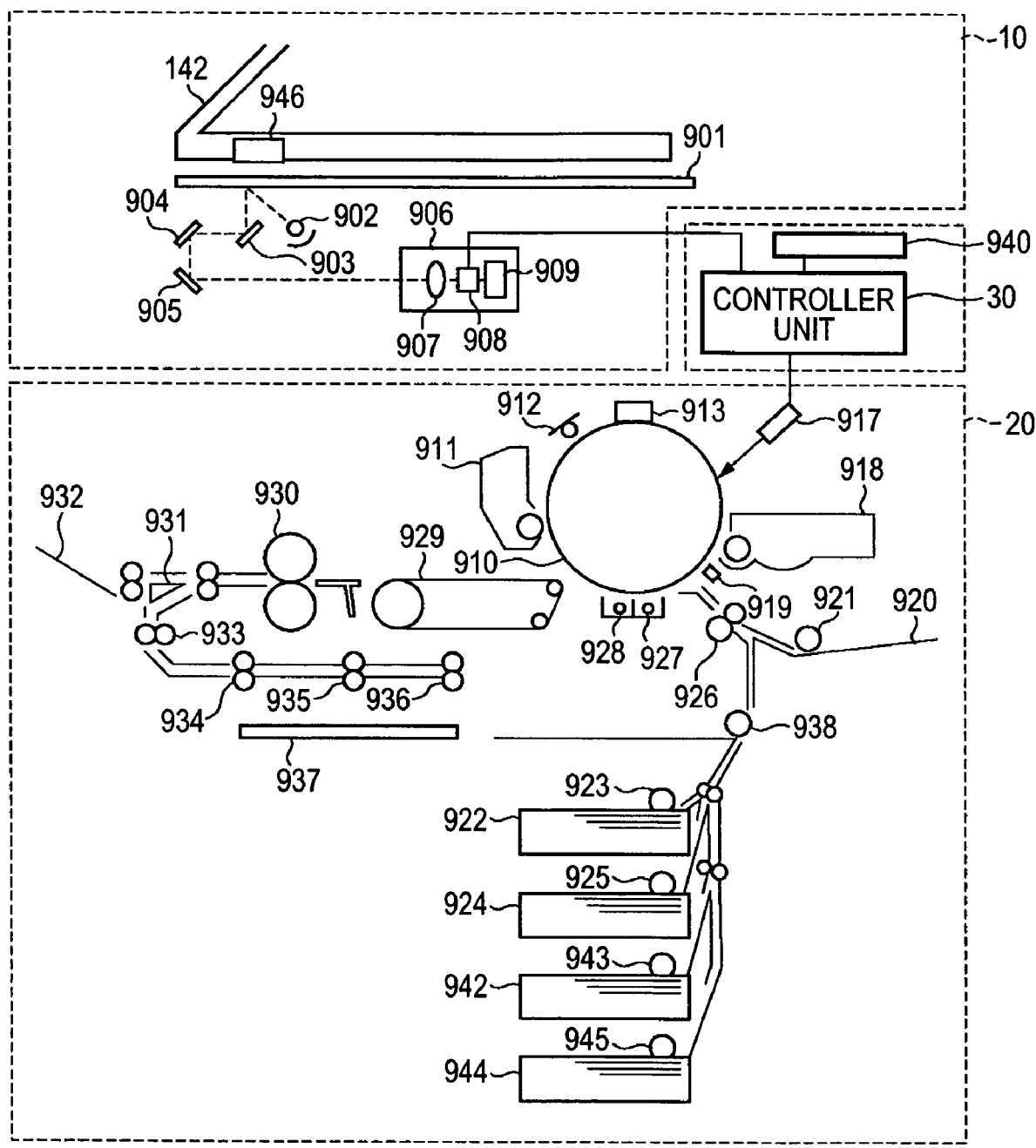
FIG. 6 shows a specific configuration of the image forming apparatus.

FIG. 6 shows a specific configuration of the digital copying machine shown in FIG. 5. Hereinafter, an operation of the digital copying machine is described in detail with reference to FIG. 6.

The scanner unit 10 includes a document glass 901, on which sheets of document fed from the document feeder 142 are sequentially placed at a predetermined position. A document illuminating lamp 902 includes a halogen lamp or the like and illuminates each sheet placed on the document glass 901. Scanning mirrors 903, 904, and 905 are accommodated in an optical scanning unit (not shown) and lead reflected light from a sheet to a CCD unit 906 while reciprocating. The CCD unit 906 includes an imaging lens 907 collecting reflected light from a document to a CCD, an image capturing element 908 including the CCD or the like, and a CCD driver 909 driving the image capturing element 908. An image signal output from the image capturing element 908 is converted to digital data of 8 bits and is input to a controller unit 30.

An RFID reader 946, which is a feature of this embodiment, reads information from the RFID tag 102 attached to the sheet 101 shown in FIG. 1 in a noncontact manner. The information can be read from each sheet that is sequentially fed from the document feeder 142.

The printer unit 20 includes a photoconductive drum 910, in which charge is removed by a pre-exposure lamp 912 in order to form an image. A primary charging device 913 allows the photoconductive drum 910 to be evenly charged. An exposure unit 917 is formed of a semiconductor laser or the like and allows the photoconductive drum 910 to be exposed to light based on image data that is processed by the controller unit 30 controlling image formation and the entire apparatus, so as to form an electrostatic latent image. A developing device 918 accommodates a black developer (toner) or the like. A before-transfer charging device 919 applies high pressure before transferring a toner image developed on the photoconductive drum 910 to a sheet of paper.

The printer unit 20 also includes paper feeding units 920, 922, 924, 942, and 944 (920 denotes a manual paper feeding unit). A sheet of paper is fed into the apparatus when a paper feeding roller 921, 923, 925, 943, or 945 is driven, stops at a resist roller 926, and is fed again in synchronization with writing timing of an image formed on the photoconductive drum 910. A transfer charging device 927 transfers a toner image developed on the photoconductive drum 910 to the fed sheet. A separation charging device 928 separates the sheet from the photoconductive drum 910 after the image has transferred thereto. Residual toner remaining on the photoconductive drum 910 is collected by a cleaner 911.

A carrying belt 929 carries the sheet to a fuser 930 after the transfer process, and then the toner is fixed by heat. A flapper 931 controls a carrying path of the sheet after the fusing process to either a sorter 932 or an intermediate tray 937. Feeding rollers 933 to 936 feed the sheet to the intermediate tray 937 after the fusing process. These feeding rollers 933 to 936 feed the sheet by inverting it during multiple printing and without inverting it during double sided printing. A re-feeding roller 938 returns the sheet placed on an intermediate tray 937 to the resist roller 926.

The controller unit 30 includes a micro computer and an image processing unit (described below) and performs the above-described image forming process in accordance with instructions from a machine interface unit 940.

<Controller Unit>

Figure 7:
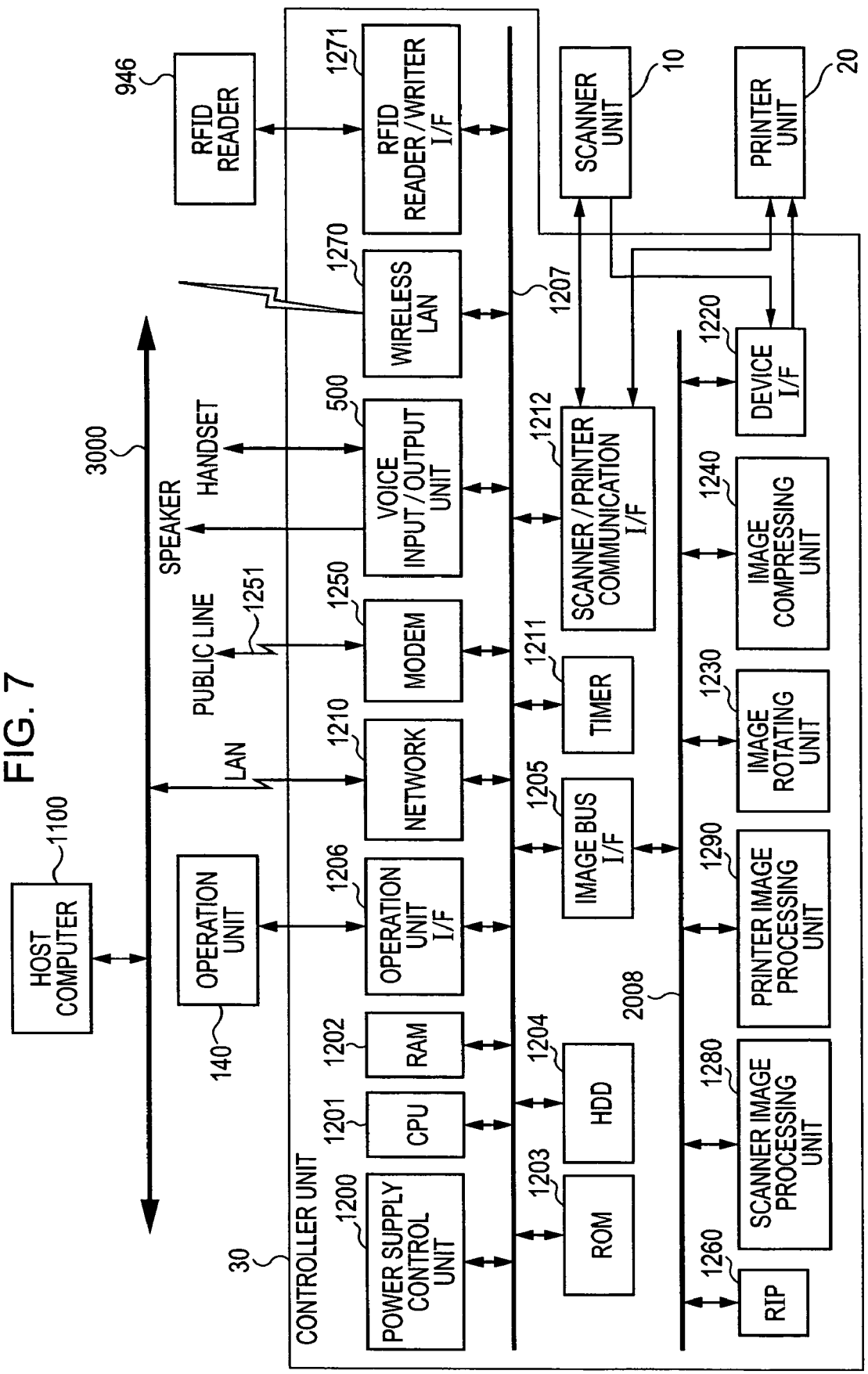
FIG. 7 shows a specific configuration of a controller unit in the image forming apparatus.

FIG. 7 shows a specific configuration of the controller unit 30 shown in FIG. 6. The controller unit 30 connects to the scanner unit 10 serving as an image input device and the printer unit 20 serving as an image output device. Also, the controller unit 30 connects to a LAN 3000 and a public line (WAN) 1251 so as to control input and output of image information and device information.

A CPU 1201 is a controller controlling the entire system. A RAM 1202 is a system work memory used by the CPU 1202 to operate and also serves as an image memory to temporarily store image data. A ROM 1203 is a boot ROM and stores a boot program of the system. An HDD 1204 is a hard disk drive and stores system software, image data, software counter values, and so on. An area for storing software counter values includes a counter area for respective paper sizes and a counter area for respective data processing amounts, and count-up is performed based on a preset arbitrary reference capacity in accordance with the number of output sheets of images or an amount of data processed by the CPU 1201. The counter values need not necessarily be stored in the HDD 1204, but can be stored in an EEPROM or the like (not shown) as long as the counter values can be kept stored even after the power is turned off.

An operation unit interface (I/F) 1206 is an interface unit for the operation unit (UI) 140 and outputs image data to be displayed on the operation unit 140 to the operation unit 140. Also, the operation unit interface 1206 transfers information that is input by a user through the operation unit 140 to the CPU 1201.

A network 1210 connects to the LAN 3000 and inputs/outputs image data to be output and information about apparatus control. Also, the network 1210 receives image data to be output from a host computer 1100 connected to the LAN 3000 or an output image data managing apparatus connected to another network (not shown) in accordance with an input operation in the operation unit 140, and outputs an image.

A modem 1250 connects to the public line 1251 and inputs/outputs information. A voice input/output unit 500 outputs voice to a speaker and controls voice output/input to/from a handset. A scanner/printer communication interface (I/F) 1212 is an interface used to communicate with CPUs of the scanner unit 10 and the printer unit 20.

A wireless LAN 1270 controls input/output of data through a wireless LAN.

An RFID reader/writer interface (I/F) 1271 is an interface unit between the RFID reader 946 for reading tag information from an RFID tag attached to paper and an RFID writer (not shown) for writing tag information. In this embodiment, the RFID writer for writing RFID information is not specifically described, but the RFID writer is placed near a slot to output printed paper, whereas the RFID reader 946 is placed near the document feeder 142 to read RFID information when scanning a document.

The above-described devices connect to a system bus 1207 in the controller unit 30.

A timer 1211 functions as a timer for setting time in the image forming apparatus and the controller unit 30 and generating interruption at predetermined time intervals. An image bus interface (I/F) 1205 is a bus bridge for connecting the system bus 1207 to an image bus 2008 that transfers image data at high speed and converting a data structure.

The image bus 2008 includes a PCI (peripheral component interconnect) bus or an IEEE (Institute of Electrical and Electronics Engineers) 1394 bus, to which the following devices are connected. An RIP (raster image processor) 1260 expands a PDL code to a bitmap image. A device interface (I/F) unit 1220 connects the scanner unit 10 and the printer unit 20 to the controller unit 30 and converts image data synchronously or asynchronously. A scanner image processing unit 1280 corrects, processes, and edits input image data. A printer image processing unit 1290 performs correction and change of resolution on image data to be printed out. An image rotating unit 1230 rotates image data. An image compressing unit 1240 performs compression/decompression processes according to JPEG (Joint Photographic Experts Group) on multilevel image data or JBIG (Joint Bi-level Image Experts Group), MMR (modified modified read), MH (modified Huffman), or the like on binary image data.

<Scanner Image Processing Unit>

Figure 8:
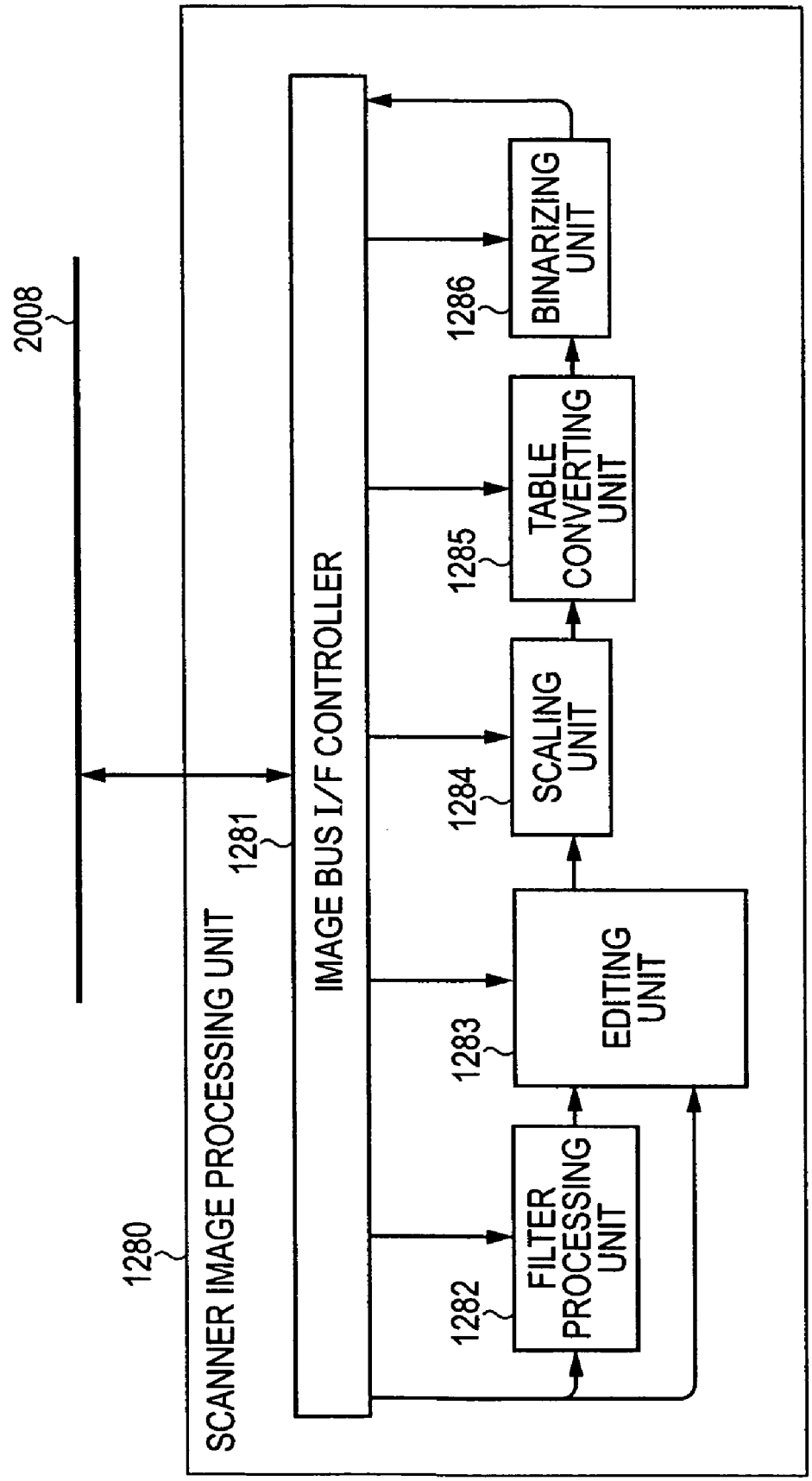
FIG. 8 shows a configuration of a scanner image processing unit in the image forming apparatus.

FIG. 8 shows a block configuration of the scanner image processing unit 1280. An image bus I/F controller 1281 connects to the image bus 2008 so as to control its bus access sequence and each device in the scanner image processing unit 1280 and to generate timing.

A filter processing unit 1282 performs convolution operation by a space filter. An editing unit 1283 edits images. For example, the editing unit 1283 recognizes a closed area surrounded by a marker pen in input image data and processes the image data in the closed area by performing shading, hatching, negative-positive inversion, and so on. A scaling unit 1284 performs scaling by performing interpolation in a main scanning direction of a raster image in order to change resolution of a read image. Scaling in a sub-scanning direction is performed by changing scanning speed of an image reading line sensor (not shown). A table converting unit 1285 converts read image data as luminance data to density data by using a predetermined table. A binarizing unit 1286 binarizes multilevel grayscale image data by using an error diffusion method or a screen process.

The image data that has been processed in the above-described manner is transferred to the image bus 2008 through the image bus I/F controller 1281.

<Printer Image Processing Unit>

Figure 9:
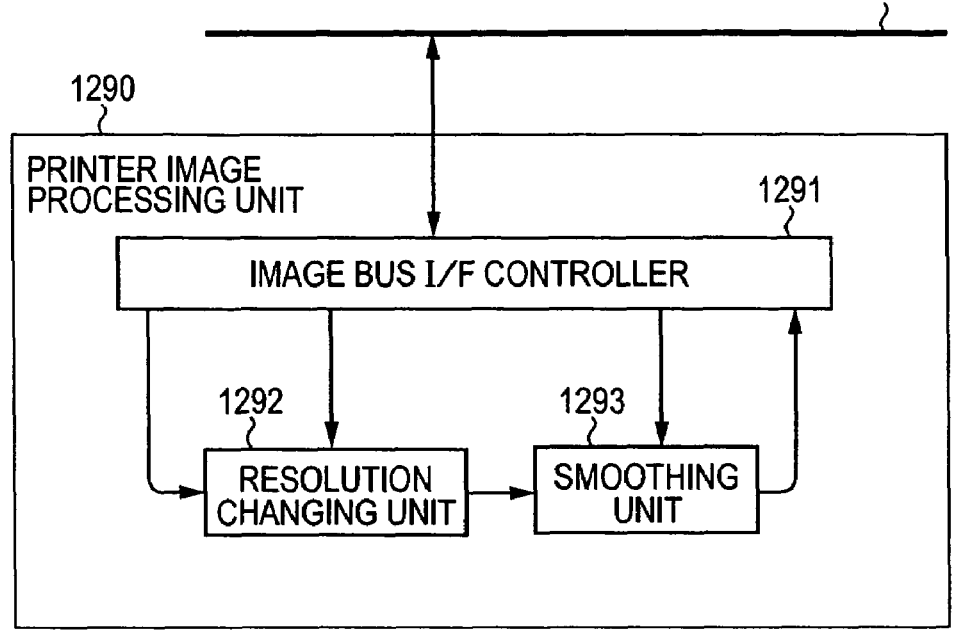
FIG. 9 shows a configuration of a printer image processing unit in the image forming apparatus.

FIG. 9 shows a block configuration of the printer image processing unit 1290. The image bus I/F controller 1291 connects to the image bus 2008 so as to control its bus access sequence and each device in the printer image processing unit 1290 and to generate timing.

A resolution changing unit 1292 changes a resolution of image data input through the network 300 or the public line 1251 to a resolution suitable for the printer unit 20. A smoothing unit 1293 performs smoothing to smooth jaggies (jaggies of images appearing at a border between black and white portions, such as slanting lines) of image data after the resolution has been changed.

<Image Compressing Unit>

Figure 10:
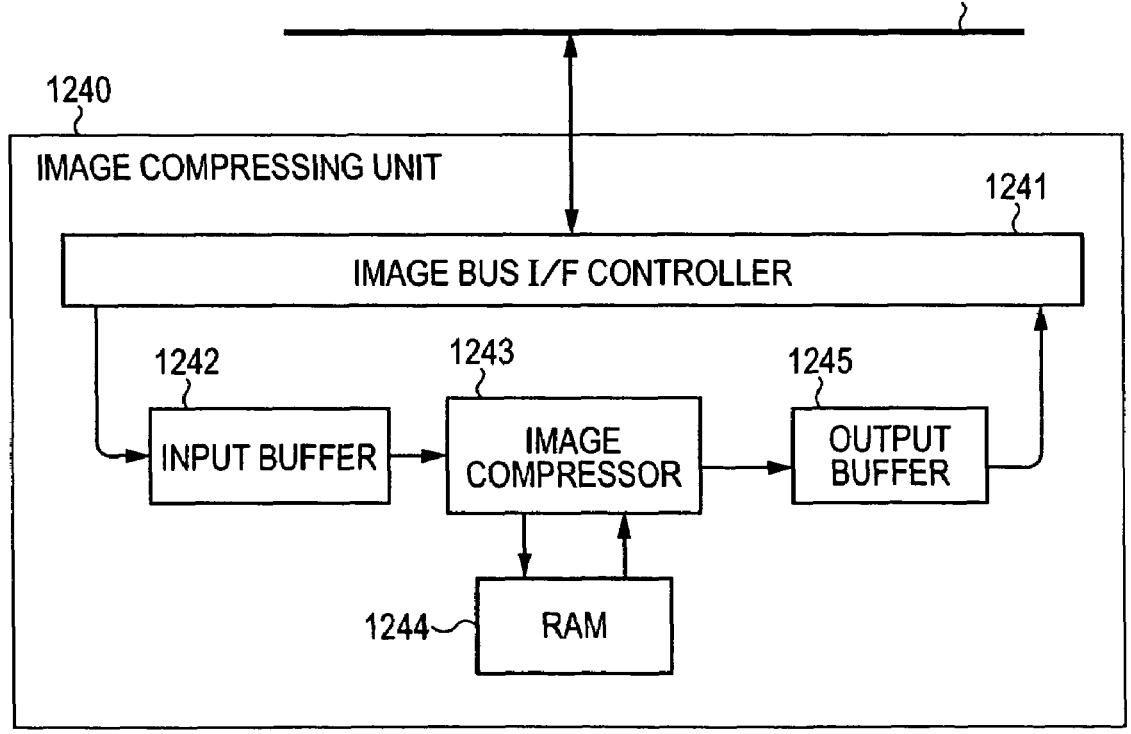
FIG. 10 shows a configuration of an image compressing unit in the image forming apparatus.

FIG. 10 shows a block configuration of the image compressing unit 1240. An image bus I/F controller 1241 connects to the image bus 2008 so as to control its bus access sequence, timing for transmitting/receiving data to/from an input buffer 1242 and an output buffer 1245, and mode setting and so on to an image compressor 1243.

Hereinafter, a process performed in the image compressing unit 1240 is described. First, the CPU 1201 performs setting for image compression control on the image bus I/F controller 1241 through the image bus 2008. According to this setting, the image bus I/F controller 1241 performs setting required for image compression (e.g., MMR compression or JBIG decompression) on the image compressor 1243. After necessary setting has been done, the CPU 1201 permits the image bus I/F controller 1241 to transfer image data. In response to this permission, the image bus I/F controller 1241 starts to transfer image data from the RAM 1202 or each device on the image bus 2008.

Received image data is temporarily stored in the input buffer 1242 and is transferred at predetermined speed in accordance with an image data request from the image compressor 1243. At this time, the input buffer 1242 determines whether the image data can be transferred between the image bus I/F controller 1241 and the image compressor 1243. If the image data cannot be read from the image bus 2008 and/or the image data cannot be written in the image compressor 1243, the input buffer 1242 performs control so that the data is not transferred. Hereinafter, such control is called a "handshake".

The image compressor 1243 temporarily stores the received image data in a RAM 1244. This is because, in order to compress image data, data of several lines is required depending on the type of process, that is, because image data of several lines must be accumulated to compress data of a first line.

The compressed image data is immediately transferred to the output buffer 1245. The output buffer 1245 performs a handshake between the image bus I/F controller 1241 and the image compressor 1243 and transfers the image data to the image bus I/F controller 1241. The image bus I/F controller 1241 transfers the received compressed (or decompressed) image data to the RAM 1202 or each device on the image bus 2008.

The above-described series of steps are repeated until the CPU 1201 stops outputting a processing request, e.g., until processing of a required number of pages ends, or until the image compressing unit 1240 outputs a stop request, e.g., until an error occurs during compression or decompression.

<Image Rotating Unit>

Figure 11:
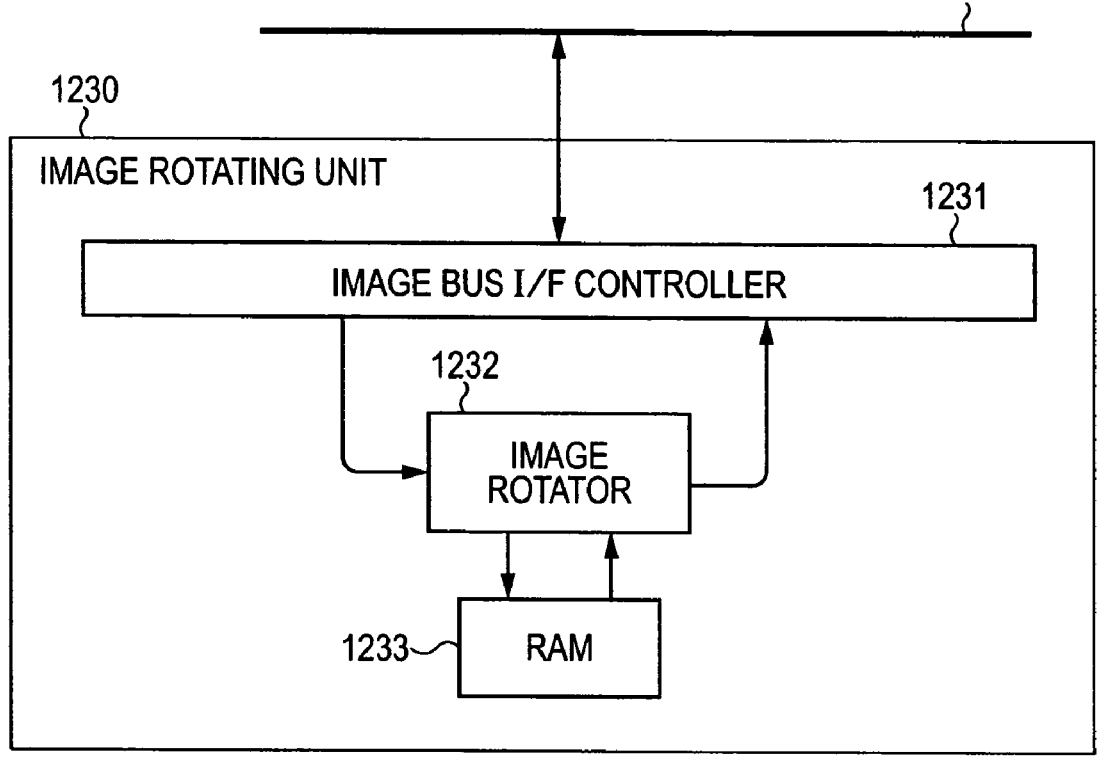
FIG. 11 shows a configuration of an image rotating unit in the image forming apparatus.

FIG. 11 shows a block configuration of the image rotating unit 1230. An image bus I/F controller 1231 connects to the image bus 2008 so as to control its bus sequence, setting of mode and so forth on an image rotator 1232, and timing to transfer image data to the image rotator 1232.

Hereinafter, a process performed in the image rotating unit 1230 is described. First, the CPU 1201 performs setting for image rotation control to the image bus I/F controller 1231 through the image bus 2008. According to this setting, the image bus I/F controller 1231 performs setting required for image rotation (e.g., image size, direction and angle of rotation, and so on) to the image rotator 1232. After the setting, the CPU 1201 permits the image bus I/F controller 1231 to transfer image data. In accordance with this permission, the image bus I/F controller 1231 starts to transfer image data from the RAM 1202 or each device on the image bus 2008.

Herein, a size of an image to be rotated is 32×32 bits, and image data is transferred to the image bus 2008 in units of 32 bits. Incidentally, the image data used here is a binary image.

Figure 12:
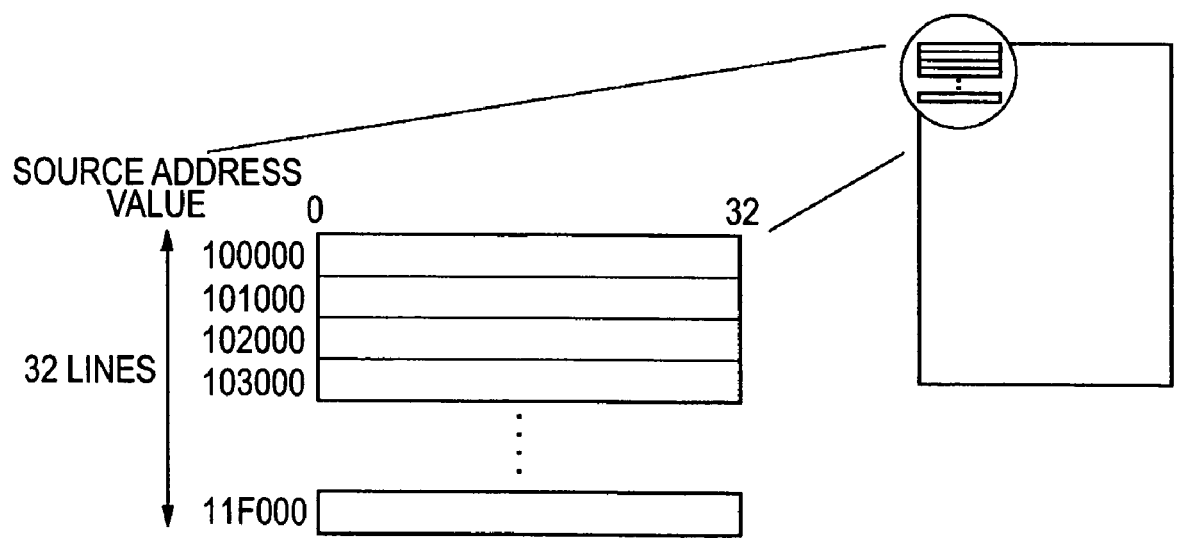
FIG. 12 illustrates a process of rotating an image.
Figure 13:
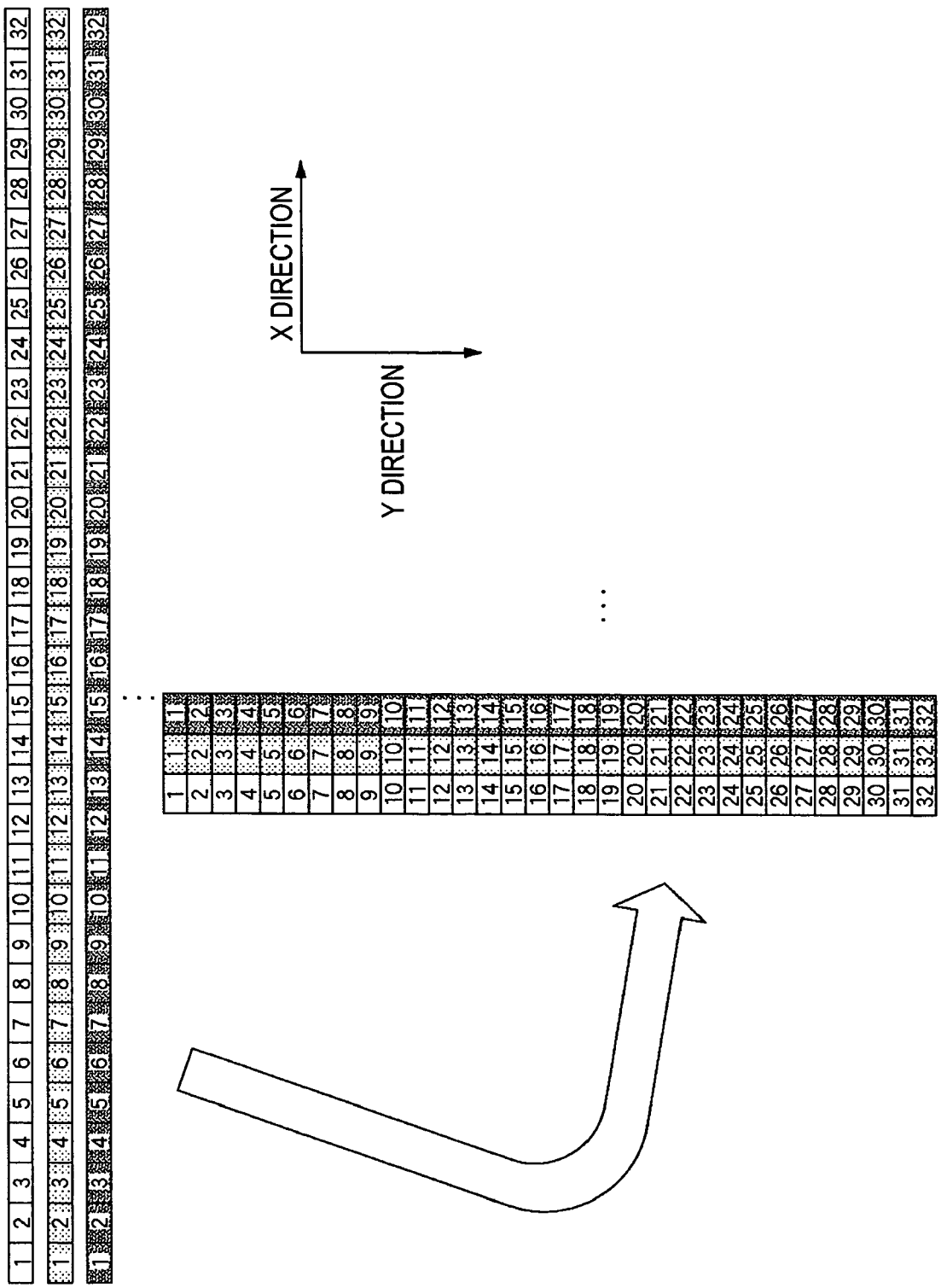
FIG. 13 illustrates the process of rotating an image.

In order to obtain the above-described 32×32-bit image data, 32-bit data must be transferred at 32 times, and the image data must be transferred from discrete addresses. FIG. 12 shows this state. The image data transferred by such discrete addressing is written in a RAM 1233 so that the image data is rotated at a desired angle when being read. For example, when the image data should be rotated counterclockwise by 90 degrees, 32-bit image data that is transferred first is written in a Y direction as shown in FIG. 13. By reading the image data in an X direction, the image is rotated.

After the 32×32-bit image data has been rotated (has been written in the RAM 1233), the image rotator 1232 reads the image data from the RAM 1233 in the above-described way and transfers the image data to the image bus I/F controller 1231.

The image bus I/F controller 1231 receives the rotated image data, performs sequential addressing, and transfers the image data to the RAM 1202 or each device on the image bus 2008. The above-described series of steps are repeated until the CPU 1201 stops outputting a processing request, e.g., until processing of a required number of pages ends.

<Device I/F>

Figure 14:
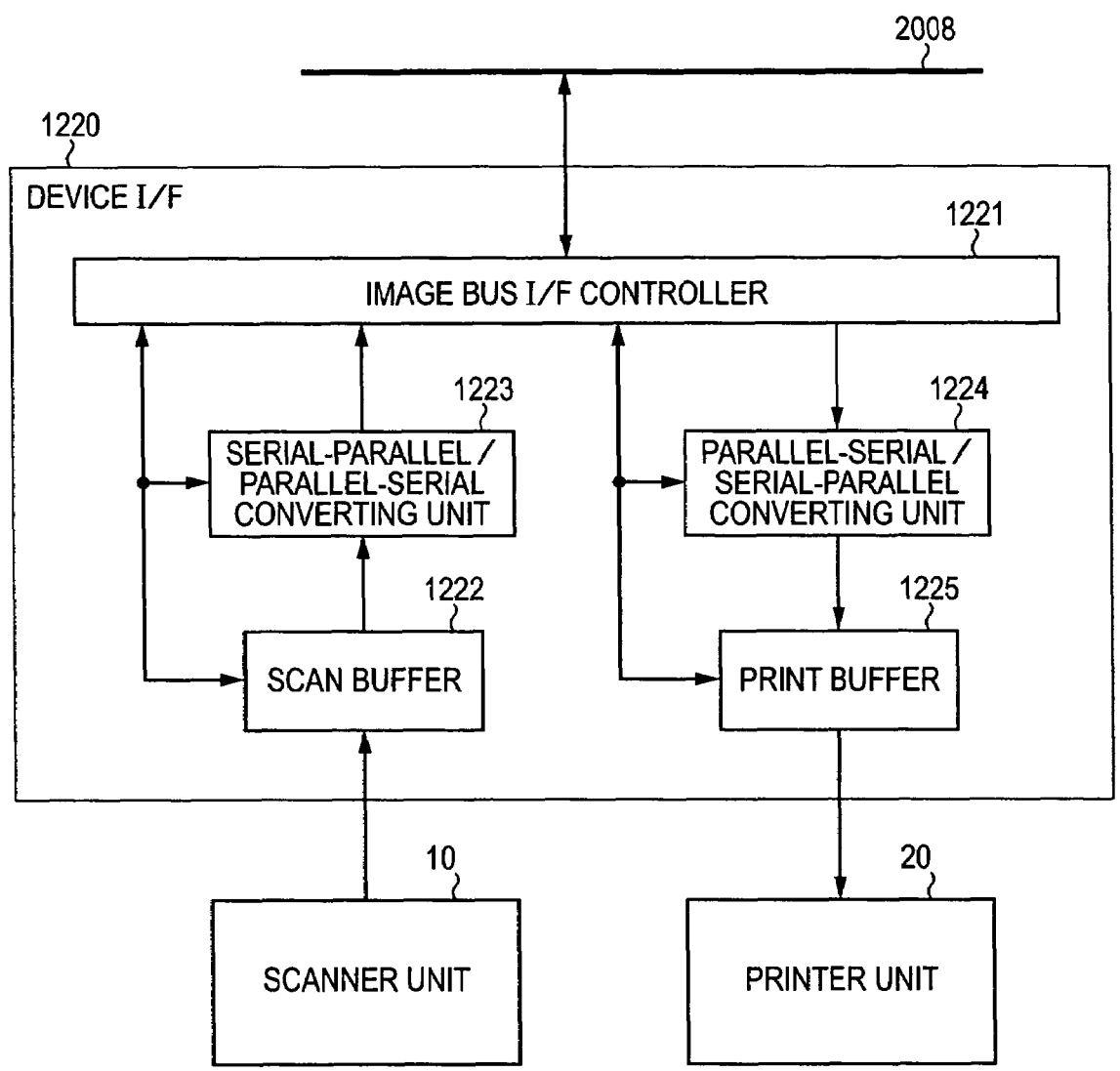
FIG. 14 shows a configuration of a device interface unit in the image forming apparatus.

FIG. 14 shows a specific configuration of the device I/F unit 1220. An image bus I/F controller 1221 connects to the image bus 2008 so as to control its bus access sequence and each device in the device I/F unit 1220 and to generate timing. Also, the image bus I/F controller 1221 generates control signals to the scanner unit 10 and the printer unit 20.

A scan buffer 1222 temporarily stores image data transmitted from the scanner unit 10 and outputs the image data in synchronization with the image bus 2008. A serial-parallel/parallel-serial converting unit 1223 arranges in an order or divides the image data stored in the scan buffer 1222 so as to convert the image data into image data having such a data width that can be transferred to the image bus 2008.

A parallel-serial/serial-parallel converting unit 1224 divides or arranges in an order the image data transferred from the image bus 2008 so as to convert the image data into image data having such a data width that can be stored in a print buffer 1225. The print buffer 1225 temporarily stores the image data transferred from the image bus 2008 and outputs the image data in synchronization with the printer 20.

Hereinafter, a process of scanning an image is described. First, image data transmitted from the scanner unit 10 is stored in the scan buffer 1222 in synchronization with a timing signal transmitted from the scanner unit 10. When the image bus 2008 is a PCI bus, after image data of 32 bits or more has been input to the scan buffer 1222, the image data of 32 bits is transmitted from the scan buffer 1222 to the serial-parallel/parallel-serial converting unit 1223 in an FIFO (first-in first-out) method and is converted to image data of 32 bits, and then the image data is transferred to the image bus 2008 through the image bus I/F controller 1221. When the image bus 2008 is an IEEE 1394 bus, the image data in the scan buffer 1222 is transmitted from the scan buffer 1222 to the serial-parallel/parallel-serial converting unit 1223 in the FIFO method and is converted to serial image data, and is then transferred to the image bus 2008 through the image bus I/F controller 1221.

Next, a process of printing an image is described. When the image bus 2008 is a PCI bus, image data of 32 bits transmitted from the image bus 2008 is received by the image bus I/F controller 1221, is transmitted to the parallel-serial/serial-parallel converting unit 1224 so as to be divided into pieces of image data of input data bit number of the printer unit 20, and is stored in the print buffer 1225. When the image bus 2008 is an IEEE 1394 bus, serial image data transmitted from the image bus 2008 is received by the image bus I/F controller 1221, is transmitted to the parallel-serial/serial-parallel converting unit 1224 so as to be converted to image data of input data bit number of the printer unit 20, and is stored in the print buffer 1225. Then, the image data in the print buffer 1225 is transmitted to the printer 20 in the FIFO method in synchronization with a timing signal transmitted from the printer unit 20.

<Operation Unit>

Figure 15:
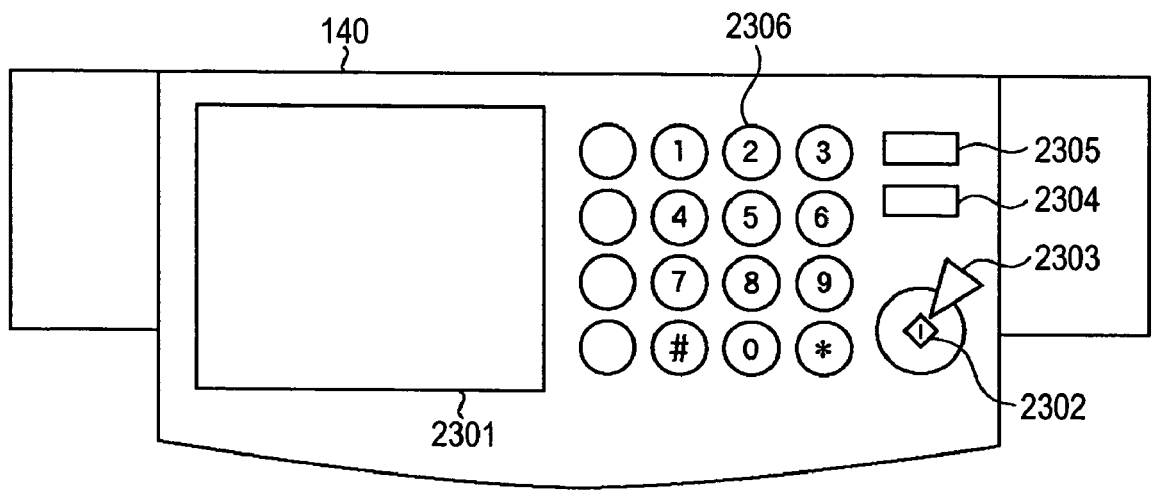
FIG. 15 shows an appearance of an operation unit of the image forming apparatus.

FIG. 15 shows an appearance of the operation unit 140. A liquid crystal operation panel 2301 is formed by combining a liquid crystal display and a touch panel and displays setting information and soft keys. A start key 2302 is a hard key for providing instructions to start copying and so on. The start key 2302 includes green and red LEDs (light emitting diodes) therein, in which the green LED is turned on when an operation can be started and the red LED is turned on when an operation cannot be started. A stop key 2303 is a hard key used to stop an operation. Other hard keys include a ten key 2306, a clear key 2305, a reset key 2304, a guide key, a user mode key, and so on.

Figure 16:
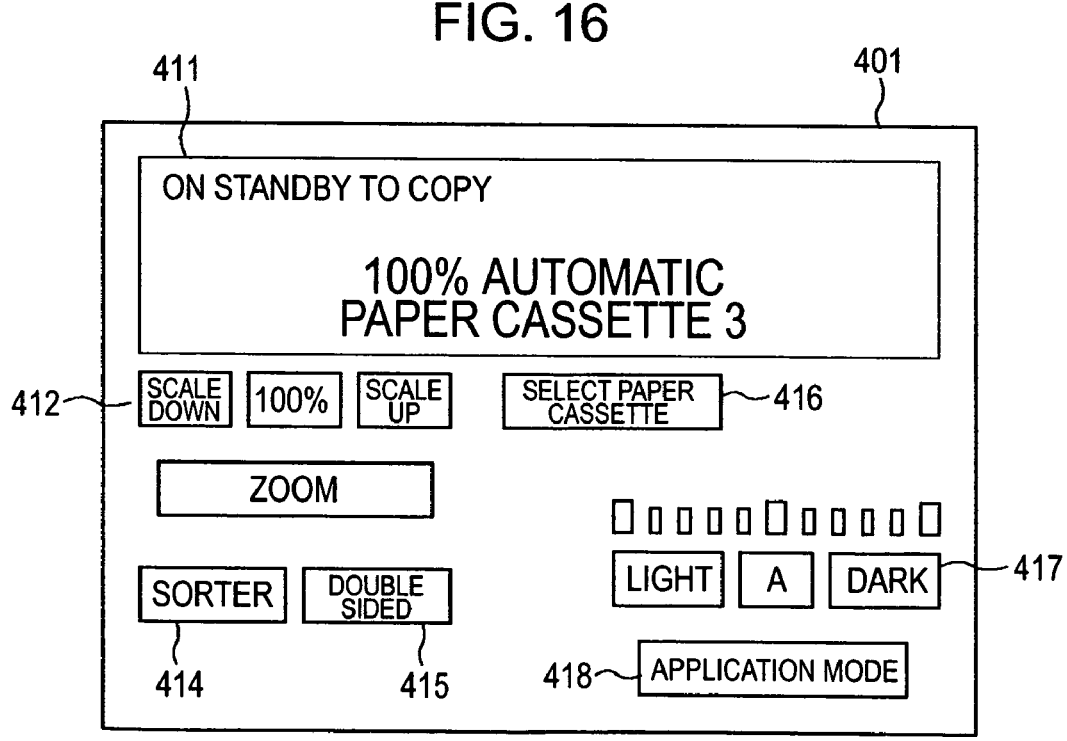
FIG. 16 shows an example of a screen displayed at a typical copying operation.

FIG. 16 shows a state where a typical copy screen is displayed on the liquid crystal operation panel 2301. In other words, this is a standby state where a copy operation is to be executed, and a document has not yet been scanned.

A setting display unit 411 shows a current operation status of the digital multifunction apparatus, and magnification, paper cassette, and number of copies that are set. Magnification soft keys 412 include soft keys for setting magnification of copy, such as a 100% key, a scale up key, a scale down key, and a zoom key. The 100% key is pressed when the magnification is set to 100%, and the scale down key and the scale up key are pressed to rescale an image with a predetermined (fixed) magnification. The zoom key is pressed to rescale an image with an arbitrary (not fixed) magnification in 1% increments. A sorter key 414 is used to specify a processing method of output paper. A double sided key 415 is used to set double sided printing. A paper cassette selecting key 416 is used to shift to a screen of specifying a size, color, and material of output paper. Density specifying keys 417 are used to adjust the density of a read or output image and display setting information. An application mode key 418 is used to shift to an application mode screen.

<Examples of Screen Displayed on Operation Unit When Scanning a Document with RFID>

Figure 17:
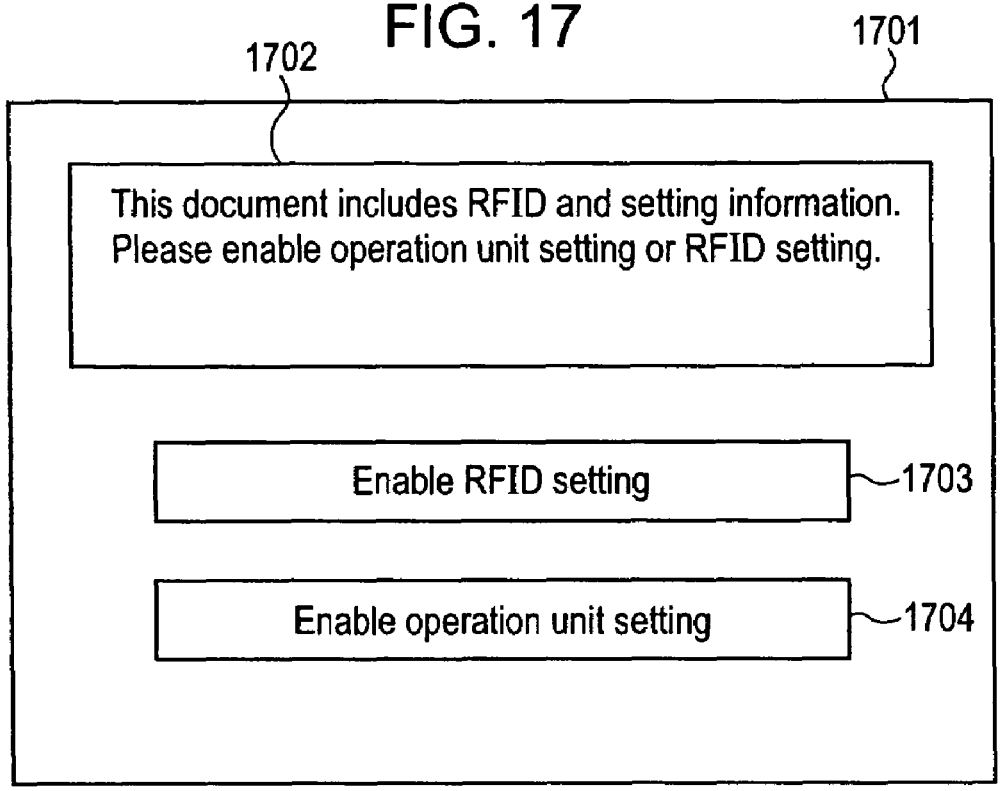
FIG. 17 shows an example of a screen displayed when a document with RFID is processed.

FIG. 17 shows an example of the liquid crystal operation panel 2301 displayed when a document with an RFID tag (feature of this embodiment) is processed. Information stored in the RFID tag 102 is read from the document with the RFID tag shown in FIG. 1, and then a message 1702 is displayed. Accordingly, a user is notified that the scanned document includes a sheet with an RFID tag and includes RFID setting information. Also, the user is allowed to select one of operation unit setting and RFID setting to be enabled. The user selects a button 1703 when the RFID setting should be enabled and selects a button 1704 when the operation unit setting should be enabled, so that a desired operation can be performed.

Figure 18:
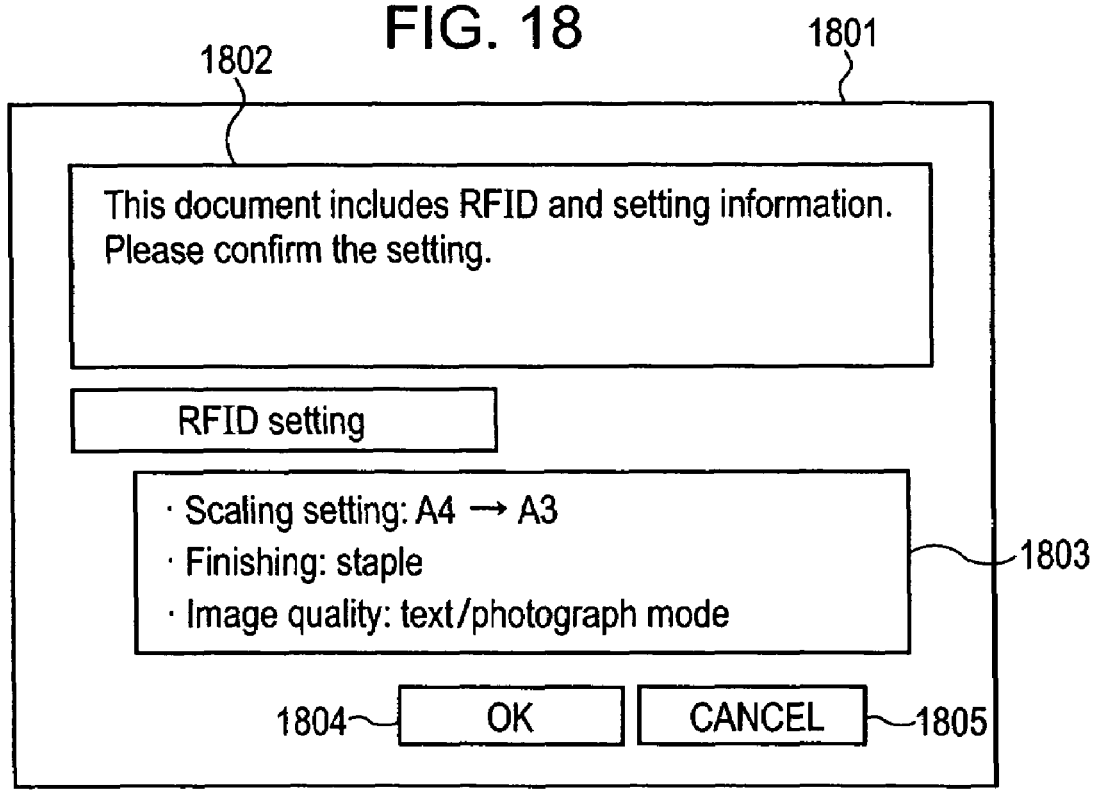
FIG. 18 shows another example of the screen displayed when a document with RFID is processed.

FIG. 18 shows another example of the liquid crystal operation panel 2301 displayed when a document with an RFID tag is processed. In this example, information stored in the RFID tag is read, a message 1802 is displayed so as to notify the user that the scanned document includes a sheet with an RFID tag and includes RFID setting information, and RFID setting information 1803 is displayed. Accordingly, the user can check the setting information stored in the RFID tag. After the user has checked the setting information, he/she selects an OK button 1804 when the RFID setting should be enabled and selects a cancel button 1805 when the RFID setting should not be enabled. As a result, a desired operation can be performed. That is, by pressing the cancel button 1805, the RFID setting is disabled and the operation unit setting is enabled.

Two examples are shown in FIGS. 17 and 18, but the present invention is not limited to these examples. For example, these two examples can be combined into one screen, where RFID setting information can be checked and setting to be enabled can be selected.

<Copying Operation (One Sheet of Document)>

Figure 19:
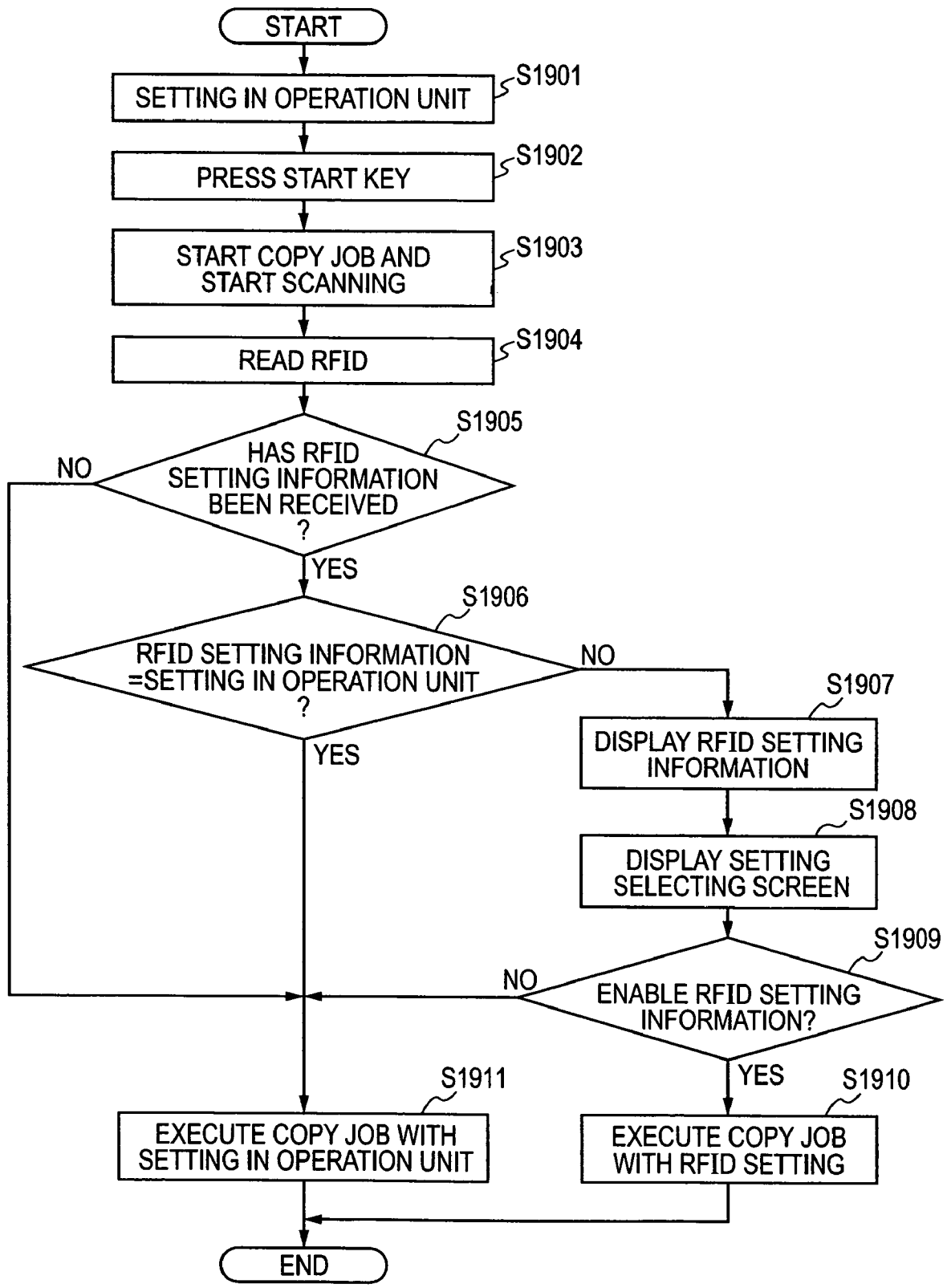
FIG. 19 is a flowchart showing an example of a copying operation according to the first embodiment.

FIG. 19 is a flowchart showing an example of a copying operation performed after a document is set on the document glass 901 in the image forming apparatus according to this embodiment.

First, in step S1901, a number of copies and magnification are set in the operation unit 140. When the start key 2302 is pressed in step S1902, the process proceeds to step S1903 where scanning of the document put on the document glass 901 starts. Then, in step S1904, RFID scanning is performed by the RFID reader 946.

After the RFID scanning, when it is determined in step S1905 that RFID setting information has not been received, that is, when it is determined that the document does not include an RFID tag, a copying operation is performed in accordance with setting in the operation unit 140. On the other hand, when the document includes an RFID tag, it is determined in step S1905 that RFID setting information has been received, and the process proceeds to step S1906 where it is determined whether the setting information in the operation unit 140 is different from the RFID setting information. If the operation unit setting information is the same as the RFID setting information, the process proceeds to step S1911 where a copying operation is performed in accordance with the operation unit setting.

On the other hand, when the operation unit setting information is different from the RFID setting information, the process proceeds to step S1907 where the RFID setting information is displayed on the liquid crystal operation panel 2301 of the operation unit 140 as shown in FIG. 18. Then, in step S1908, a selecting screen for selecting one of the operation unit setting and the RFID setting is displayed as shown in FIG. 17. Alternatively, the screens displayed in steps S1907 and S1908 may be displayed on the same screen in one step.

When the operation unit setting is selected in step S1909, a copying operation is performed in accordance with the operation screen setting in step S1911. Of course, when the RFID setting is selected, the process proceeds to step S1910 where a copying operation is performed in accordance with the RFID setting.

The flowchart shown in FIG. 19 is only an example of this embodiment. Another process can also be adopted as long as the process includes steps of reading RFID tag information and allowing the user to check the setting before the document is printed out.

<Copying Operation (a Plurality of Sheets of Document)>

Figure 20:
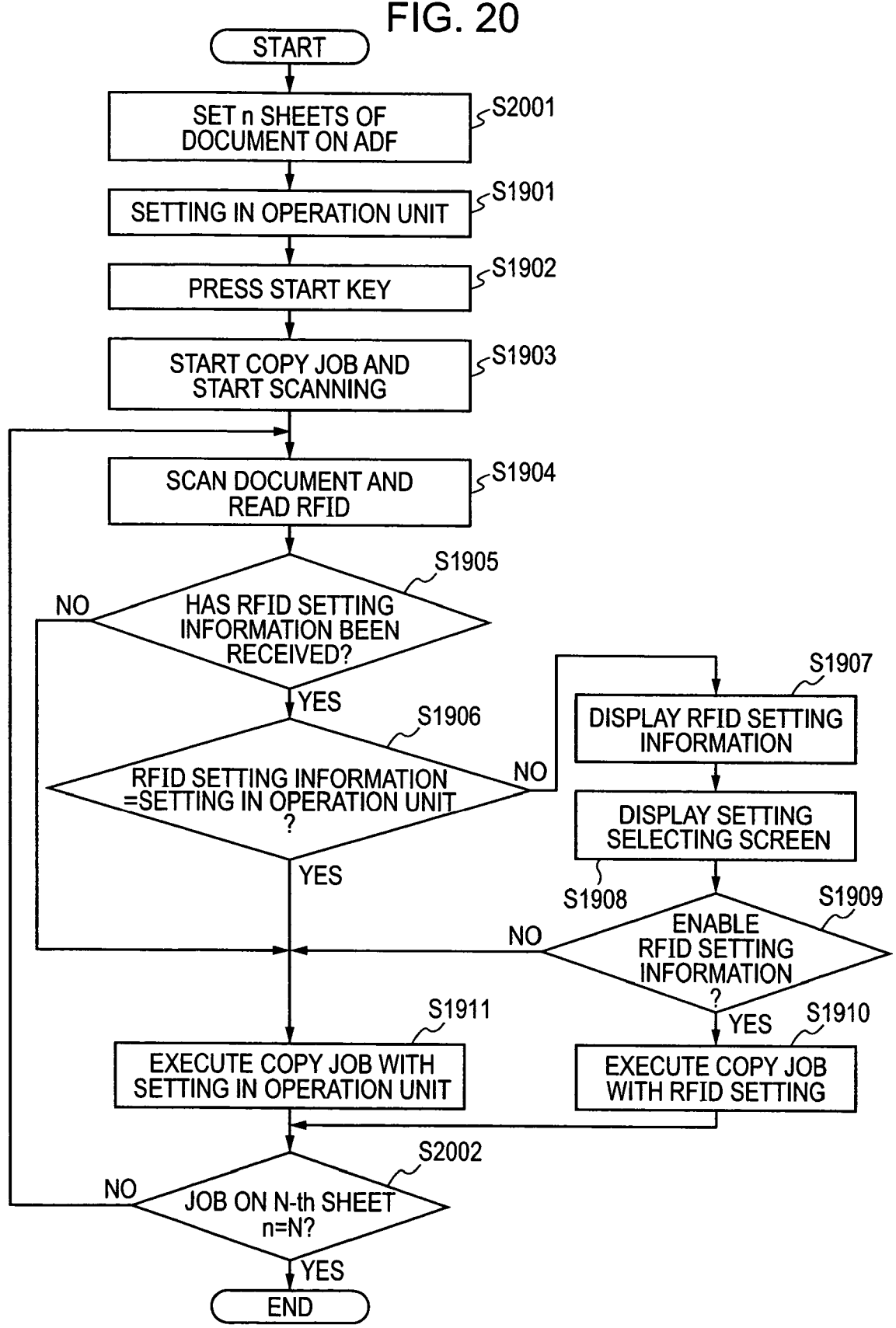
FIG. 20 is a flowchart showing another example of the copying operation according to the first embodiment.

FIG. 20 is a flowchart showing an example of a copying operation performed after a plurality of sheets of document is set on the document feeder 142 in the image forming apparatus according to this embodiment. In FIG. 20, the process is basically the same as in the flowchart shown in FIG. 19. Therefore, the steps which are the same as those in FIG. 19 are denoted by the same step numbers and the detailed description is omitted.

In FIG. 20, n sheets of document are set on the document feeder 142 (S2001), and the same process as in FIG. 19 is performed, that is, RFID information is read and the user checks the setting every time a sheet of the document is read (S2002).

As described above, according to this embodiment, the user can select to enable one of the setting according to setting information read from an RFID tag and the setting made in the operation unit in order to perform an image forming process using a document with an RFID tag. Therefore, a result desired by the user can be reliably generated even when both settings are different from each other.

Further, since the user selects the setting only when the RFID setting is different from the operation unit setting, a checking operation performed by the user can be minimized.

Second Embodiment

Hereinafter, a second embodiment according to the present invention is described. The configuration of a sheet with an RFID tag and an image forming apparatus according to the second embodiment is the same as that in the above-described first embodiment, and thus the corresponding description is omitted.

Figure 21:
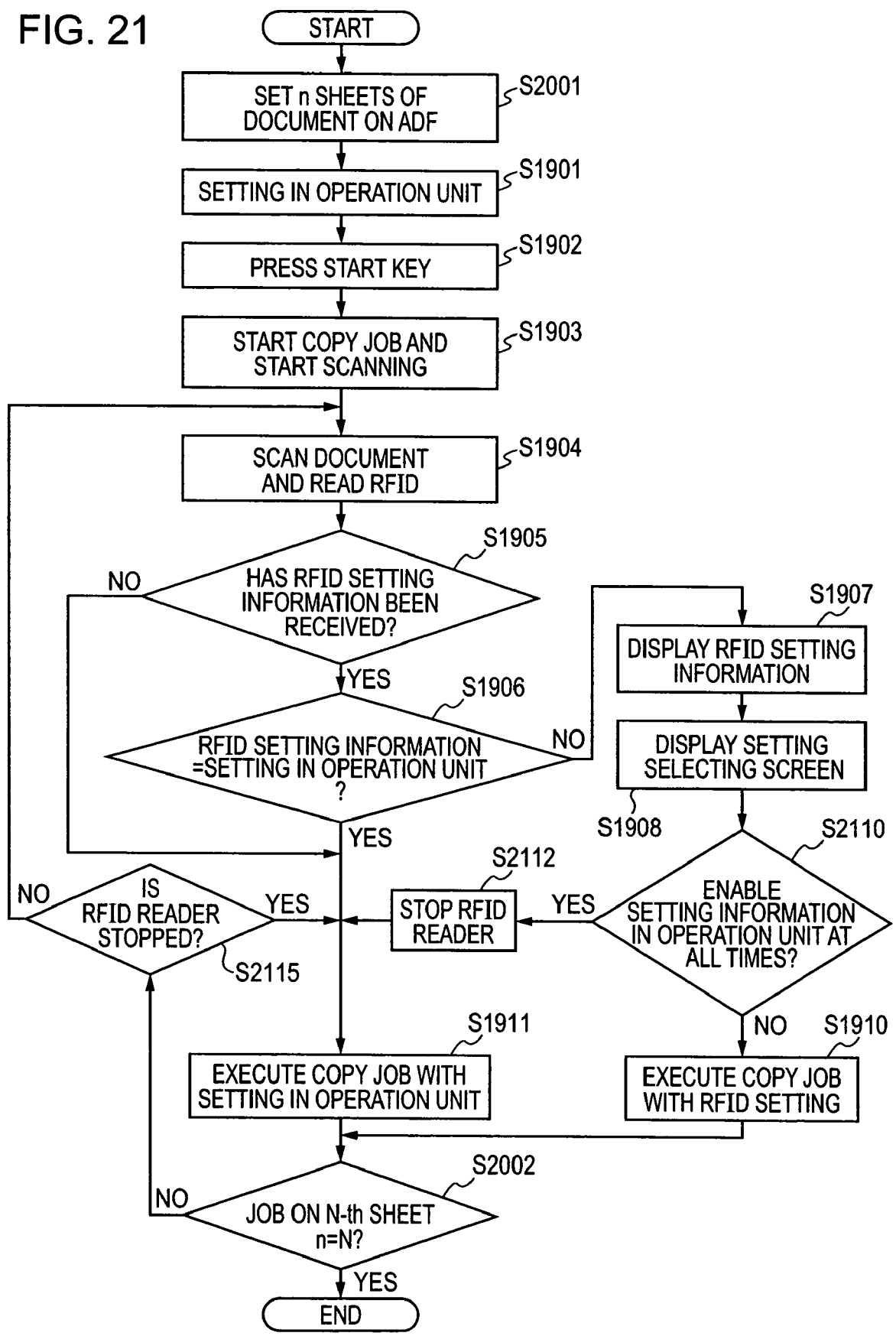
FIG. 21 is a flowchart showing an example of a copying operation according to a second embodiment.

In the second embodiment, too, a plurality of sheets of document is read by using the document feeder 142 so as to perform a copying operation. FIG. 21 shows an example of a copying operation according to the second embodiment. In FIG. 21, the process is basically the same as that in the above-described first embodiment shown in FIG. 19. Therefore, the same steps as those in FIG. 20 are denoted by the same step numbers and the specific description is omitted.

In the second embodiment, the user selects in step S2110 whether the operation unit setting should be enabled at all times, in other words, whether the RFID setting should be disabled thereafter. For example, when the user determines that the setting stored in the RFID tag 102 is different from the setting in the operation unit 140 by seeing a displayed screen shown in FIG. 18 and that a result desired by the user will not be printed out, the user can enable the setting in the operation unit at all times by canceling the RFID setting.

After the user selects to always enable the operation unit setting in step S2110, the process proceeds to step S2112 so as to stop the operation of the RFID reader 946. Accordingly, an RFID tag is not read any more, so that the operation unit setting is enabled at all times. In other words, once the RFID reader 946 is stopped, stop of the RFID reader 946 is checked in step S2115 at scanning of a document thereafter. If the RFID reader 946 is stopped, an RFID reading step and setting checking step in steps S1904 to S1906 are not performed, and the process skips to step S1911, where a copying operation is performed in accordance with the setting in the operation unit.

As described above, according to the second embodiment, an RFID reading operation and a setting information checking operation are not performed when the setting is done so that the operation setting is enabled at all times. Accordingly, a processing speed can be increased.

In the above-described embodiments, a message is displayed when setting information stored in an RFID tag is different from setting information stored in the operation unit. However, the present invention is not limited to these embodiments, and another method can also be used as long as a message can be transmitted to the user. For example, an LED may be lighted or a buzzer may be used. Also, the users operation performed in response to the message can be replaced by another operation, e.g., pressing a predetermined button.

Other Embodiments

The present invention can be applied to a system composed of a plurality of apparatuses (e.g., a host computer, an interface apparatus, a scanner, and a printer) or a single apparatus (e.g., a multifunction apparatus).

The embodiments of the present invention can be carried out by supplying a storage medium (or a recording medium) storing program code of software realizing the functions of the above-described embodiments to a system or an apparatus and by allowing a computer (or CPU or MPU) of the system or apparatus to read and execute the program code stored in the storage medium. In this case, the program code read from the storage medium realizes the functions of the above-described embodiments, and thus the storage medium storing the program code constitutes the present invention. Of course, the functions of the above-described embodiments may be realized when the computer reads and executes the program code or when an operating system (OS) operating in the computer executes part or whole of actual processing based on the instructions of the program code.

Further, after the program code read from the storage medium has been written into a memory of a function expanding card inserted into the computer or a function expanding unit connected to the computer, a CPU or the like included in the function expanding card or the function expanding unit may execute part or whole of actual processing based on the instructions of the program code, and the processing may realize the functions of the above-described embodiments.

When the present invention is applied to the above-described storage medium, the storage medium stores program code corresponding to the above-described flowcharts.

As described above, according to this embodiment, a user can select a first mode in which processing conditions set by the user through a user interface unit of the image forming apparatus capable of reading RFID information as predetermined information can be used. When the first mode is selected, the image forming apparatus is controlled so as to be operated in the first mode. Alternatively, the user can select a second mode in which processing conditions based on the predetermined information can be used. When the second mode is selected, the image forming apparatus is controlled so as to be operated in the second mode. The other characteristic configurations of a control method for the image forming apparatus are as described above in the embodiments. By adopting the above-described configuration, problems described in the related art can be solved. Also, the operability of the image forming apparatus capable of forming images by using a document with an information tag can be enhanced. Further, even when setting based on information read from an information tag of a document is different from setting in the operation unit, the problems described in the related art can be prevented and a result desired by the user can be generated.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims the benefit of Japanese Application No. 2004-285165 filed Sep. 29, 2004, which is hereby incorporated by reference herein in its entirety.

What is claimed is:

1. An image forming apparatus comprising:
an image forming unit configured to form an image on a sheet;
a user interface unit configured to allow a user to set a first image forming condition for forming the image on the sheet;
a memory reading unit configured to read a second image forming condition for forming the image on the sheet from a memory medium;
a display unit configured to display the second image forming condition read by the memory reading unit;
a selector configured to select one of the first image forming condition and the second image forming condition based on an instruction from the user in a case where the first image forming condition is different from the second image forming condition; and
a controller configured to, in a case where the first image forming condition is different from the second image forming condition, control the image forming unit to form the image based on the one of the first image forming condition and the second image forming condition selected by the selector and control the display unit to display the second image forming condition, and in a case where the first image forming condition is the same as the second image forming condition, control the image forming unit to form the image according to the information that is common between the first image forming condition and the second image forming condition and control the display unit not to display the second image forming condition.

2. The image forming apparatus according to claim 1, wherein the memory medium is embedded in a paper medium.

3. The image forming apparatus according to claim 2, further comprising:
a document reading unit configured to automatically feed and read each of a plurality of paper media of document,
wherein the memory reading unit is configured to read the second image forming condition from each of a plurality of memory media embedded in each of the plurality of paper media.

4. The image forming apparatus according to claim 1, wherein the reading unit reads the second image forming condition from the memory medium in a wireless manner.

5. The image forming apparatus according to claim 1, wherein the memory reading unit stops operating responsive to the selector selecting the first image forming condition.

6. The image forming apparatus according to claim 1, further comprising:
a document reading unit configured to read the image on the paper medium in which the memory medium is embedded,
wherein the image forming unit forms the image read by the document reading unit on the sheet.

7. The image forming apparatus according to claim 1,
wherein the display unit displays a selecting screen for selecting one of the first image forming condition and the second image forming condition in a case where the first image forming condition is different from the second image forming condition, and wherein the selector selects one of the first image forming condition and the second image forming condition based on the instruction from the user in a case where the selecting screen is displayed by the display unit.

8. A method for controlling an image forming apparatus having an image forming unit for forming an image on a sheet and a user interface unit, the method comprising:

setting a first image forming condition for forming the image on the sheet in response to a setting instruction from a user via the user interface unit;

reading a second image forming condition for forming the image on the sheet from a memory medium;

selecting one of the first image forming condition and the second image forming condition based on an instruction from the user in a case where the first image forming condition is different from the second image forming condition;

in a case where the first image forming condition is different from the second image forming condition, controlling the image forming unit to form the image based on the selected image forming condition and controlling a display unit to display the second image forming condition; and in a case where the first image forming condition is the same as the second image forming condition, controlling the image forming unit to form the image according to the information that is common between the first image forming condition and the second image forming condition and controlling the display unit not to display the second image forming condition.

9. The method according to claim 8, wherein the memory medium is embedded in a paper medium.

10. The method according to claim 9, further comprising the steps of:

automatically feeding and reading each of a plurality of paper media of document; and allowing reading the second image forming condition from each of a plurality of memory media embedded in each of the plurality of paper media.

11. The method according to claim 8, wherein the reading step includes reading the second image forming condition from the memory medium in a wireless manner.

12. The method according to claim 8, further comprising stopping reading the memory medium when the first image forming condition is selected.

13. A computer-readable storage medium storing a program to execute the method according to claim 8.

14. The method according to claim 8, further comprising:

generating the image by reading the paper medium in which the memory medium is embedded, wherein the image forming unit forms the image generated by reading the paper medium on the sheet.

15. The method according to claim 8,
wherein a selecting screen for selecting one of the first image forming condition and the second image forming condition is displayed in a case where the first image forming condition is different from the second image forming condition, and wherein one of the first image forming condition and the second image forming condition is selected based on the instruction from the user in a case where the selecting screen is displayed.

* * * * *